United States Patent
Kennedy et al.

(10) Patent No.: US 8,789,120 B2
(45) Date of Patent: Jul. 22, 2014

(54) TEMPORAL VIDEO TAGGING AND DISTRIBUTION

(75) Inventors: Sean Kennedy, San Diego, CA (US); Edward Winter, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/425,579

(22) Filed: Mar. 21, 2012

(65) Prior Publication Data

US 2013/0254816 A1     Sep. 26, 2013

(51) Int. Cl.
*H04N 7/173* (2011.01)
*G10L 17/00* (2013.01)
*G06K 9/00* (2006.01)
*H04N 9/80* (2006.01)

(52) U.S. Cl.
USPC ............ 725/109; 704/246; 382/118; 386/241

(58) Field of Classification Search
CPC ..................................................... H04N 21/83
See application file for complete search history.

(56) References Cited

U.S. PATENT DOCUMENTS

| | | | |
|---|---|---|---|
| 2003/0093790 A1* | 5/2003 | Logan et al. ................... 725/38 |
| 2003/0234806 A1* | 12/2003 | Toyama et al. ............... 345/723 |
| 2004/0233983 A1* | 11/2004 | Crawford et al. ........ 375/240.01 |
| 2005/0068581 A1* | 3/2005 | Hull et al. ..................... 358/1.16 |
| 2006/0239648 A1* | 10/2006 | Varghese ......................... 386/95 |
| 2008/0092168 A1* | 4/2008 | Logan et al. ..................... 725/44 |
| 2009/0059008 A1* | 3/2009 | Ishii ............................... 348/169 |
| 2009/0103887 A1* | 4/2009 | Choi et al. ........................ 386/52 |
| 2009/0136208 A1* | 5/2009 | Gilboa-Solomon et al. ..... 386/95 |
| 2009/0254823 A1* | 10/2009 | Barrett ........................... 715/716 |
| 2009/0300475 A1* | 12/2009 | Fink et al. ...................... 715/230 |
| 2010/0008547 A1* | 1/2010 | Yagnik et al. ................. 382/118 |
| 2010/0088726 A1* | 4/2010 | Curtis et al. ..................... 725/45 |
| 2010/0246965 A1 | 9/2010 | Epshtein et al. |
| 2010/0274820 A1 | 10/2010 | O'Brien et al. |
| 2010/0287053 A1* | 11/2010 | Ganong et al. ............. 705/14.66 |
| 2012/0213490 A1* | 8/2012 | Steiner .......................... 386/241 |
| 2013/0041905 A1* | 2/2013 | Davies .......................... 707/748 |

OTHER PUBLICATIONS

IBM—"Variable Depth Video Distribution"—IP.com Prior Art Database, IP.com No. IPCOM000182609D, May 4, 2009, pp. 1-4.

* cited by examiner

*Primary Examiner* — Nathan Flynn
*Assistant Examiner* — William J Kim
(74) *Attorney, Agent, or Firm* — John P. O'Banion

(57) ABSTRACT

A method and apparatus for temporal tagging of videos in response to identification of locations on the video where persons in a contact list of a user are identified in response to facial recognition. The temporal tags can be retained within the video, or contained separately in a metadata file having fields to indicate time locations in the video and identified persons seen at those locations. Use of the temporal tags allows for automatic distribution of content relevant to the recipient, based on their presence in the video, or of persons in the video of which they are interested.

20 Claims, 10 Drawing Sheets

TEMPORAL VIDEO TAGGING AND DISTRIBUTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video capture and storage, and more particularly to tagging and distribution of video materials.

2. Description of Related Art

The uses of video information abounds in modern society. Aside from the ability to store and view video content, it is becoming increasing beneficial to archive video materials from which segments are extracted.

However, it is most common for video information to be stored in files containing one or more segments of video, although the video may contain more than one person, place or thing. It is also difficult to distribute video content elements in response to the specific recipient party, as today it is necessary to edit a source file and create a separate video for each individual, or desired distribution context upon which distribution is desired.

Accordingly, a need exists for a new video tagging paradigm which overcomes the shortcomings of existing video storage mechanisms and provides additional benefits for the storage and distribution of video.

BRIEF SUMMARY OF THE INVENTION

An apparatus and method for tagging video clips by their timeline and content, whereby each section of the video is referenced by tags that relate to specific people (or places, things, activities, and other identifiable video elements) which can be automatically shared with a desired set of contact(s). In this way videos can be tagged and stored for automatic sorting and distribution. The temporal tags are generated by the system in response to automated and/or user directed temporal tag placements utilized in combination with facial recognition data and contact information.

The apparatus and method can be implemented on a variety of devices which are configured for video processing, such as personal computer systems, portable media-enabled devices (e.g., cell phones), internet client devices, internet server devices, video recording and playback equipment, cameras, and the like.

Embodiments of the invention can be configured to automatically perform temporal tagging, based on what the processor can identify from the video, such as being responsive to a user database of contacts, photos, or other input. For example, at least one embodiment utilizes recognition algorithms, such as facial recognition for identifying persons within the video segments, upon which automatic tagging is performed. Temporal tags are thus inserted automatically at the locations where individuals appear in the video.

In at least one embodiment, the temporal tags are in the form of metadata which can be contained within a modified video file format, or more preferably retained in a markup language that is associated with a given video file and associated time (temporal) locations within the video with information in the tag, for instance the names of identified persons, places, or things found at that location.

In at least one embodiment, the temporal tags comprise data retained within the video, and incorporate indexes indicating positions within the video and identifications of persons appearing at those locations in the video. In at least one embodiment the temporal tags comprise metadata retained separately from the video, and include indexes indicating positions within the video and identifications of persons appearing at those locations in the video.

The temporal tagging is preferably performed in response to both a "content library" and a "metadata reference library". The "content library" contains all videos and photos the user has on their device. In at least one embodiment, all known contacts and facial recognition data, and all the locations (positions) that they appear in videos for the user, are contained in the "metadata reference library". Facial recognition metadata in the metadata reference library can also be aggregated from the photo content of the user as well as on-line social networking sites of the user.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
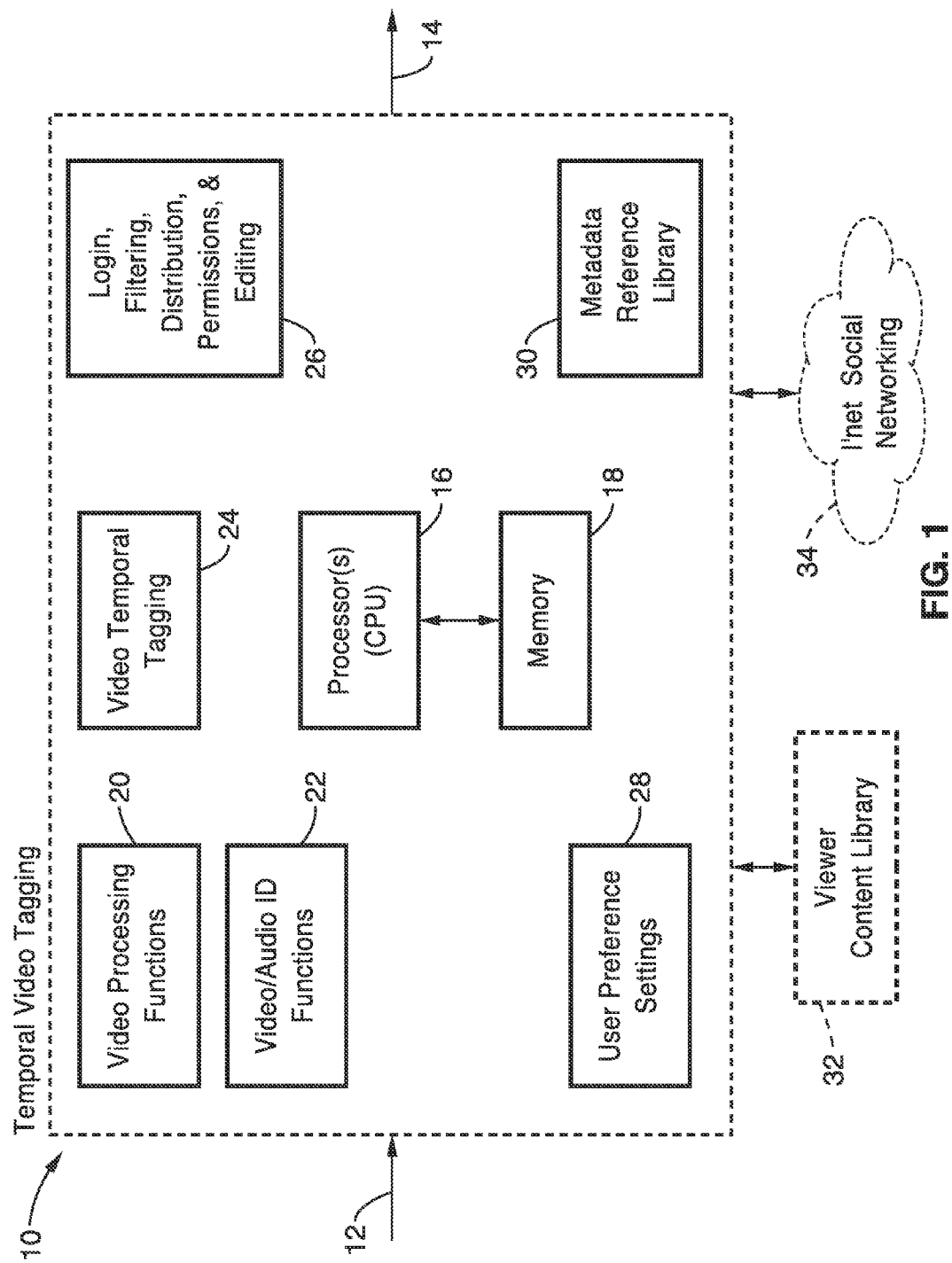
FIG. 1 is a block diagram of a system configured for temporal video tagging according to an embodiment of the invention.

Temporal video tagging leverages video content from a specific context, such as in relation to a specific user (e.g., friends, interests, locations), and makes these videos readily accessible based on the temporal tagging. These differentiated tags can be configured so that a specific person (or group) is directed to specific portions of the video content, while limiting access as desired to other portions of the video. It will be appreciated that the tags provide for temporal identification, and can control viewing permissions accordingly as desired. Video clips can contain more than one person, subject, location, or other element that can be tagged for sorting and distribution.

Temporal tagging is performed in response to outside sources of information (e.g., outside the video being tagged), such as about persons found within the "content library" of the user in which videos and photos are stored, and the "metadata reference library" containing specific identification information, such as all known contacts with associated facial recognition data, and video location (position) information about where they appear in videos as contained within the user content library or otherwise accessible to the user device. The apparatus is also configured for utilizing specific identification information, such as facial recognition metadata, as aggregated from on-line social networking sites of the user.

The temporal video tagging apparatus overcomes the shortcomings of prior video storage and distribution mechanisms in a number of areas.

In at least one embodiment, "automatic temporal tagging" is performed by leveraging the information available to the system (what the system 'knows') about your friends, from using social networking data, other existing media tags, face and/or voice recognition files and so forth.

In at least one embodiment, "manual temporal tagging" is performed, having an assisted contacts search function that leverages available system information about friends from social networking data, other existing media tags, face and/or voice recognition, and so forth.

In at least one embodiment, the method and apparatus performs manual or auto-sharing of content based on the temporal tags generated in response to the user's content library in combination with the user's metadata reference library, or a selected portion thereof. For example, the user can automatically distribute videos which are tagged for all the persons identified in the metadata reference library, or to specific groups identified within the metadata reference library (e.g., immediate family, close friends, friends, co-workers, relations, and so forth).

In at least one embodiment, the method and apparatus utilizes the temporal tagging to enable creation of shortened video sequences containing highlights related to a specific individual "tagged" in the video, persons close to that specific individual, or to identified interests of the individual. By way of example and not limitation, a user can select to automatically have the system send "Grandma Smith" all video highlights related to themselves and the grandchildren, so anything tagged as "Grandma" or "grand children" gets included in the shortened copy of the video.

In at least one embodiment, the method and apparatus facilitates sharing the video in a common location/distribution server, while still conferring the ability to filter access to sections of the file.

In at least one embodiment, the method and apparatus performs video sharing which allows access to be filtered in response to the tagged user/viewer so that the recipient is only able to view portions of the video that would be expected to be most important to them as determined in response to a comparison between the temporal tags of the video, contact information (database), and the settings established by the sender which select which portions are of interest to which recipients.

By way of example and not limitation, the system allows user "Ann" to automatically tag a video segment, so that when the segment is played by her mother she only sees portions of the video which would be considered important to her, in this example a segment of video in which her mother is giving gifts to her daughter at a birthday celebration being recorded on video. Ann specifies a tag on that section of the video so when her mother views it she can only stream the section which is assigned to her. Ann can select to allow her mother to view other sections in response to a selection of extended content, and/or can block permission to view any or all of the other portions.

In at least one embodiment, the method and apparatus performs the video sharing with the ability to limit a user's/viewer's access to the file based on the temporal tags. By way of example and not limitation, the user "Ann" only wants her family to be able to view part of the file, so she specifies a "Family only" tag on that section of the video so that only people in her contact list marked as "family" can view it. By way of a second example, "George" is not particularly enamored by watching videos of his mother-in-law, whereby his wife tags the video of their daughter's birthday party so George only sees the sections that don't include his mother-in-law.

In at least one embodiment, the method and apparatus utilizes automatic temporal tagging as a crime prevention and prosecution tool. The invention in this scenario provides for scanning of video evidence, determining what the system knows about the people in the video using facial and/or voice recognition (and optionally other data such as criminal trait, habitual body gestures, common body signals, and other known information). If a criminal is identified in the video, the video clip and the identity could be shared between different law enforcement agencies, and could eventually be used to help prosecute a criminal.

In at least one embodiment, the method and apparatus catalogs even unknown faces for retention in the metadata reference library, thus preventing a loss of information and eliminating the need for re-analysis once the identity of the unknown individual is determined. For example, person "XYZ" at time stamps Jan. 2, 2012 are replaced by "John Smith/facebookID: 1243124/Gmail:js@gmail.com". It will be appreciated that the above identifications are based on facial recognition. However, other elements can be similarly identified in the video, such as identification, or augmentation of facial identification, utilizing voice pattern recognition (voice recognition). In addition, the present invention can be utilized for identifying other elements in the video, such as physical locations (landmarks: e.g., Eiffel Tower, Zoo, Run XYZ on Bear Mountain, and so forth). These locations are preferably determined in response to digital recognition algorithms comparing images against a reference database of locations. Alternatively, the location can be determined in response to user input, or from global positioning data embedded within or accompanying a given video. This information can be utilized at a subsequent time, for instance when assembling video clips. Generic highlights can also be tagged within the video, such as based on audio signatures (e.g., cheering crowds sounds, abrupt changes in audio, and so forth).

FIG. 1 illustrates an example embodiment 10 of an apparatus for temporal video tagging (TVT) according to the invention. It should be appreciated that the invention can be implemented as an apparatus, system, application program (application) executing on a computer enabled device, method performed by programming executable on a processor, or a non-transitory media containing programming for a method executable on a processor, or combinations thereof without limitation. For the sake of simplicity, the text will use the term apparatus, application, system or method depending on context, without indicating that it is equally applicable to apparatus, application, system and method.

Input video 12 is shown received by a TVT apparatus which generates video outputs 14. The apparatus and method can be implemented on a variety of devices which are configured for video processing, such as personal computer systems, client or server computer systems, video repository systems, video recording and playback equipment, cameras, and similar computer based systems for capturing, retrieving, viewing or processing videos. At least one processor 16 and associated memory 18 are depicted for executing the method and its functions, as well as for storing data associated with a TVT application.

Each of the function blocks shown within embodiment 10 can be implemented by programming executable on processor 16 and its associated memory 18, either separately or in combination with additional hardware, such as accelerators, video processors, and so forth without limitation. Similarly, each of the storage elements (library and setting) can be retained in a memory coupled to the apparatus, or one accessible to the TVT apparatus.

Video processing functions 20 are shown which can be optionally utilized in conjunction with the temporal tagging by the TVT apparatus in processing the video inputs, or generating specific forms of video output. In at least one embodiment, these functions include video search, video editing, and video transition functions. By way of example, video transitions (e.g., fade, mix, dissolve, cross-fade, wipe, cut, and digital effects in their numerous variations and combinations) can be selected for use in connecting segments of the temporal tagged video when it is viewed, to improve the appearance over abrupt scene changes. These transitions can also be personalized in response to the temporal tags, as desired, such as displaying the individuals name. The form and length of transition is preferably established in response to user preference settings and/or user input. The following example is provided by way of example and not limitation.

The user "Ann" only wants her family to be able to view part of the file, so she specifies a "Family only" tag on that section of the video so that only people in her contact list marked as "family" can view it. The transitions and video enhancement functions can be used to make smooth shifts between tagged portions of the video, or could be used to make the video clip more interesting to watch (e.g., complex splash screen, fade transition for wipe #1 and explosion transition for wipe #2). Each of these preferably being controlled by any desired combination of control parameters, including preference settings of "Ann", explicit control of transitions by "Ann", or even in response to preference overrides by the specific viewers.

By way of a second example, in which the face of "Bob" is detected, the name "Bob" flashes on the screen, such as in neon letters as part of the transition.

By way of a third example, in which audio effect of an explosion or pop is detected, a video enhancement of an explosion overlay with transparent text might be added over the top of the live footage.

These sections of video are temporally tagged and the metadata is saved for future video projects. For example, if the user wants the system to assemble a video compilation of "Bob" exploits using tagged videos.

No detailed explanations of the above are provided as the general operation of video editing, transition and search functions are well known in the art.

Returning to the description of FIG. 1. Video/Audio identification (ID) functions 22 are shown which are capable of identifying elements within a video, such as performing facial recognition and optionally audio (speech) recognition to identify persons from a video in response to a recognition data set, such as generated in response to photographs or other videos of the user in which persons have been identified by the user, or elements containing audio of that individual. In addition, the identification functions can be used for identifying transitions in the video, such as in response to video or audio changes. Furthermore, audio identifications can be provided by the module, such as identifying persons by their voice, or identifying events associated with particular types of sounds (i.e., applause, singing, engine noise, explosions, and the like).

A video temporal tagging function 24 performs the actual tag creation, such as in response to video processing 20 and identification 22, with tags in at least one embodiment being stored in files of a metadata reference library 30 having a link to the associated video (e.g., same base file name, or a link to the video), which is typically stored in the viewer content library 32, or optionally stored at a location on the internet 34, such as on a social networking site.

Table 1 depicts an example of a metadata temporal tag for a video segment called "Bobs_birthday.avi" in San Diego dated Feb. 14, 2012 at 12:05 PM in which temporal tags were created for contacts "Bobby", "Cheryl", "Sean" and "Grandma", depicted herein with three indexes per contact referring to the places where each individual is referenced in the video. It should be recognized that this temporal tag example is but one way of storing this information. One of ordinary skill in the art will realize that the fields and formats can be varied without departing from the present invention.

It will be appreciated that although the individuals are referred to above with their first name only, the temporal tag preferably also contains a unique system wide identifier for each of these individuals, such as their logon name for a social networking site, or other unique ID. The TVT system also preferably provides an application for updating temporal tags, and for configuring temporal tags for use with a specific set of identifiers. By way of example, a set of metadata created for use on a first social networking site, is processed to change the identifiers for use with a second social networking site. Furthermore, the temporal tags can be stored with generic names as described in the text, wherein these references are resolved on the user system when distributing videos, or at the time the user uploads the video and temporal tagging onto a social networking site.

A set of video tagging selection functions 26 are depicted as controlling log-in, filtering, distribution, permissions, and editing, by way of example and not limitation.

User preference settings 28 are accessed by the TVT apparatus, so that intelligent choices can be made regarding desired feature implementation details, as well as for retaining information for the user, including optional information about persons and what group (e.g., family, friends, etc.) to which they belong. This data can be stored locally, or may be stored off-line from the TVT apparatus, such as on another computer or over the internet, although retrieval of certain data from remote storage may slow operation.

In at least one embodiment of the invention, contact information for the user is configured to include the retention of information regarding what persons (and optionally information) each person in the contact list is interested in. For example, Grandma is interested in any video of any of her five grandchildren, and somewhat less interested in videos regarding her three children. Grandpa on the other hand is only somewhat interested in videos of the grandchildren, but is always interested in cars and travel. Embodiments of the present invention thus allow these relationships to be retained in the user contacts, for use when tagging, and/or distributing videos. For example, a "persons of interest field" under Grandma would contain identifiers for the five grandchildren and can be marked with a high priority (view all), while the names of her children could be listed and marked at a lower priority (view some). Under an "items of interest" field Grandpa may have listed "automobiles", and "travel". It should be appreciated that not all selection mechanisms will be available on all embodiments of the invention. It will be appreciated particular implementations can be customized for desired operating characteristics without departing from the teaching presented herein.

A metadata reference library 30 contains all known contacts with facial recognition data, and all the temporal locations in which they appear in videos that the user has on their device. It will be noted that facial recognition metadata stored here could be determined from photo or video content of specific persons, which could be stored locally or on-line, such as at social networking sites.

A viewer content library 32 is shown which is typically retained outside of the TVT application. It will be noted, however, that the viewer content library can be retained anywhere within the computer system upon which the TVT application operates, or any external storage accessible to the TVT application. This library contains videos of the user, and preferably photo content as well. For the sake of compatibility, embodiments of the present invention preferably do not require that the videos and photos of the viewer content library be in a format specific to the TVT application, but instead the TVT application is configured for accessing conventionally stored video and photos.

An internet interface 34 is shown which is exemplified for interfacing with internet social networking sites of the user through a connection to the internet.

Each of the above described elements interoperates toward providing the benefits of temporal video tagging described herein.

Figure 2:
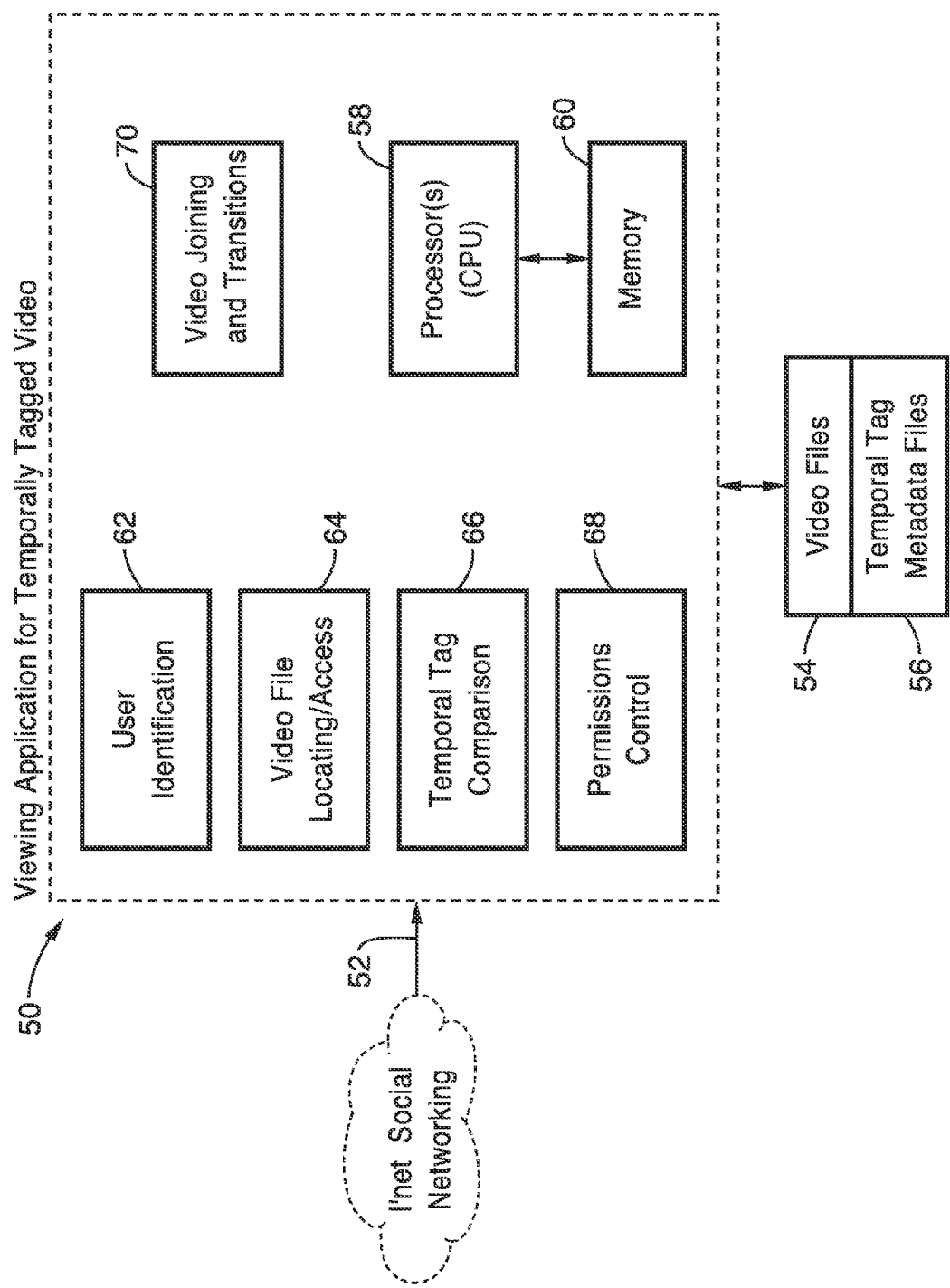
FIG. 2 is a block diagram of a viewing application for temporally tagged video according to an embodiment of the invention.

FIG. 2 illustrates an example embodiment 50 of a viewing application responsive to temporal video tagging according to the invention. The viewing application controls access to portions of the temporally tagged video in response to a comparison between the identity of the viewer and the identification of a person or group identified in a temporal tag of a metadata file for said video. In at least one embodiment of the invention, the temporal tags are contained external to each associated video file, whereby a viewing application configured according to the invention provides selecting viewing in response to the temporal tags for a given video. By way of example, the viewing application is depicted as being implemented on a social networking server which receives a user access 52, and upon which another user has previously uploaded video content containing video files 54 and associated metadata files 56 containing the temporal tags for the video files. The viewing application is executed on a server, or other computer device configured for processing video files which has a processor 58 and memory 60.

It is assumed in this block diagram that a client logs on to the site and in so doing identifies themselves. This identification information is then utilized 62 within the viewing application for determining files relevant to the client. A video file locating and access control block 64, determines the set of uploaded files which are relevant to the client based on contact information. For example, the client who logs in is listed on the social networking site as a friend, family member, or co-worker of the individual posting the videos. Once prospective videos are found for the client, then temporal tags are compared 66 from the videos to determine if they match up with this client. Matches can then be further resolved with a permission control block 68 which determines specific segments of the videos to be viewed by the client. The segments of video associated with the client are then joined and appropriate transitions between sections executed 70 to provide a pleasant viewing experience.

By way of example, "Joe Smith" logs on and is apprised by the system that his sister "Jane Smith" has uploaded video of the birthday party for their mother "JaJo Smith". In response to the temporal tags associated with this video, Joe is directed to segments of the video in which he and his family members are seen at the birthday party. It will be noted that the person uploading the original video file (Jane Smith) granted viewing permissions to Joe Smith and his family and friends (as users on the social networking site), although the permissions could be more restricted to only Joe Smith in response to selection by the uploading user. On selecting the video to watch, Joe Smith sees segments of the original video selected on the basis of the temporal tags which are typically automatically joined by the system utilizing transition effects, such as simple dissolves. Furthermore, the file may have been uploaded without restrictions, wherein Joe Smith can elect to watch the tagged portions only, or select to watch the entirety of the video, and jump forward/backward in the video based on the temporal tags.

Figure 3A:
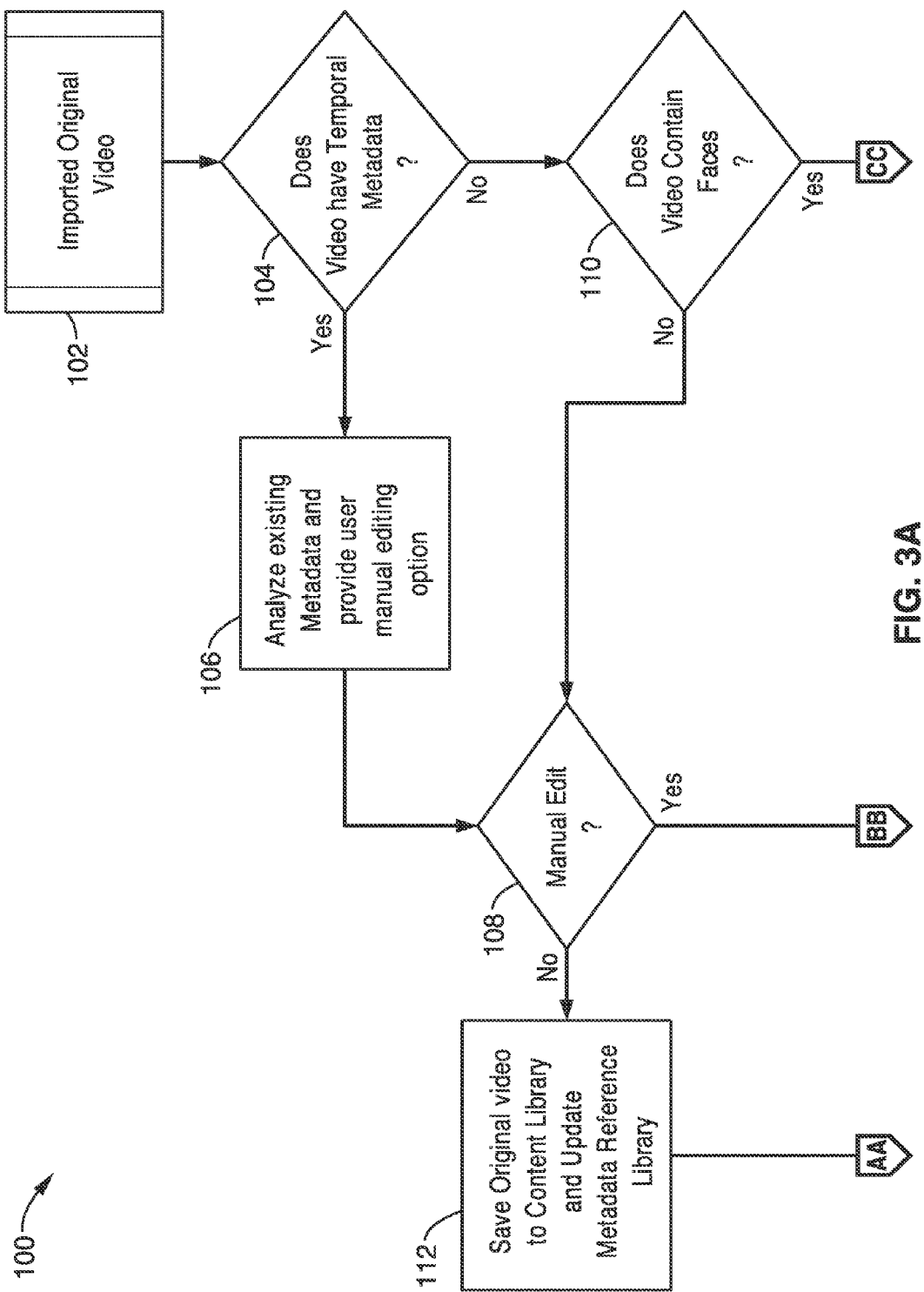
FIGS. 3A and 3B are a flow diagram of automatic temporal tagging including manual editing according to an embodiment of the invention.
Figure 3B:
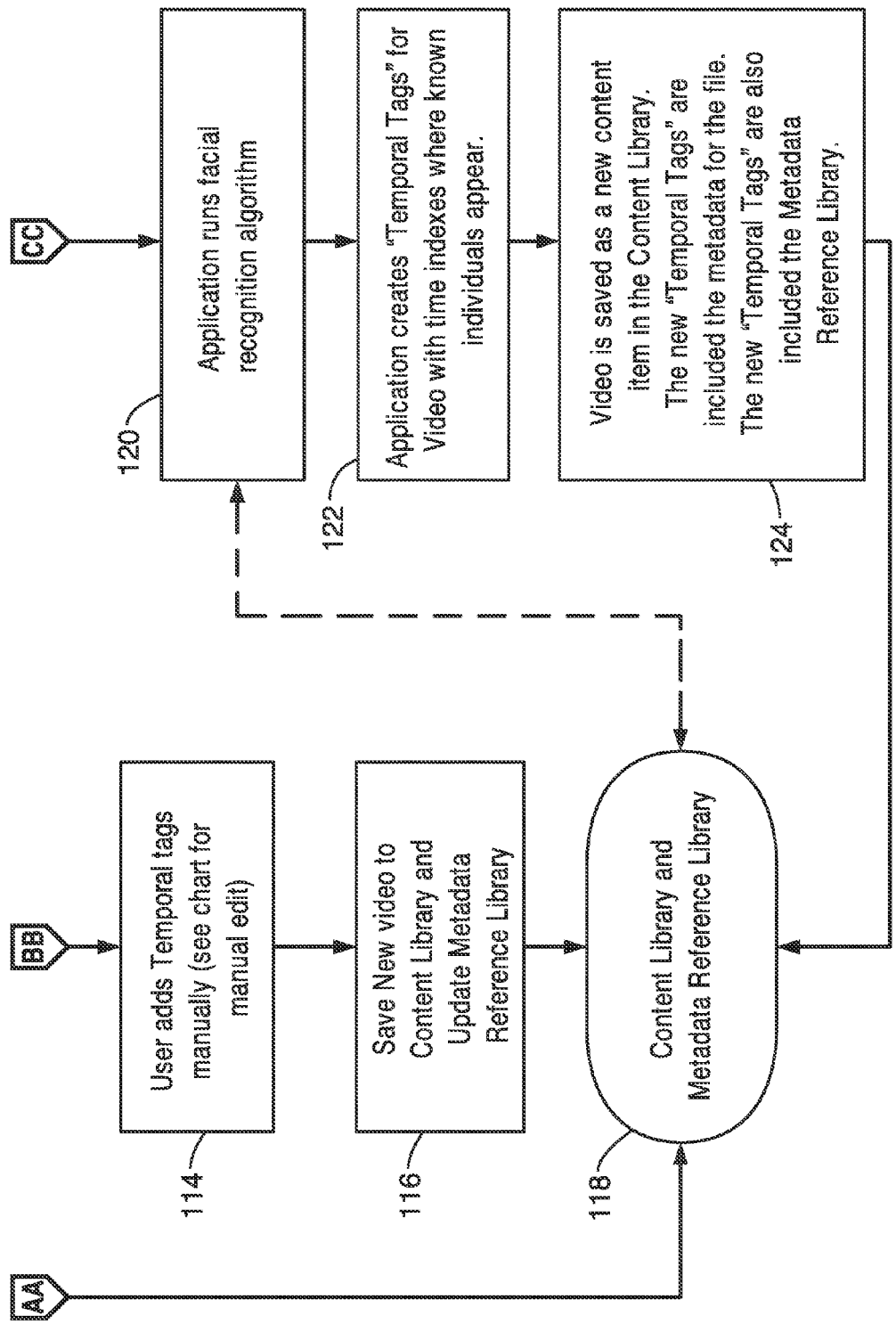

FIG. 3A and FIG. 3B illustrate automatic temporal tagging logic 100 according to the invention. A video is received 102 for processing, upon which a check is made 104 for associated temporal metadata. If temporal metadata is found associated with the video, then it is analyzed at block 106 and the user provided with an option for manual editing. A check for manual input 108 is performed. This manual editing step 108 is also reached in response to determining that no readily identifiable content elements exist 110 in the video.

If no manual editing input is provided, then the video is saved 112 and the metadata reference library is updated as necessary. In the case of detecting manual editing input, block 114 is executed in which the user controls adding of temporal tagging, after which the changes are stored 116, such as in the combination of metadata reference library and optionally the user content library 118.

It should be appreciated that for video files which themselves contain the tags, such as tags comprising metadata, the temporal tagging function of the invention adds the data (e.g., metadata) to the video itself, wherein the video is changed in response to the temporal tagging process of the invention, wherein the video itself must be resaved in response to temporal tagging. In this case, a tagged file and a non-tagged file are intrinsically different. The metadata tags on the video have corresponding data in the metadata reference library so the application (or the user) can quickly find and filter all the video content on the system.

In at least one embodiment of the invention, the metadata temporal tags are contained in the video itself, and incorporate starting and ending points as well as contact data, so that the video can be filtered if the user (or user's contacts) don't yet have that metadata in their metadata reference library. For example: "Bob" sends a video to "Ann" that she has never downloaded before. The tags on the video itself get added to her metadata reference library automatically. That way the contact and time indexes can also be referenced by her if she decides to send the video to someone else, or if she wants to add her own tags. Typically, the system would process most of this locally, however, the present invention can be configured for handling them remotely, even to the extent of retaining the database references in the internet "cloud", so the metadata is in a shared location.

If identifiable content is found 110 (FIG. 3A), in the received video, exemplified as containing recognizable faces, then the application attempts to identify 120 (FIG. 3B) these elements and their location. In particular, facial recognition can be performed in block 120, with the application generating temporal tags and time indexes 122 where specific individuals appear, and then updating the metadata and/or content files 124 as necessary. In another embodiment, execution continues after block 122 at block 108, to allow the user to perform manual editing after automatic insertion of temporal tags.

It will be noted that individuals for which facial recognition data exists (connecting a name with facial recognition features) are identified by their given name, or a logon name or similar identifier. Preferably, unknown individuals are still identified and given a computer generated label which the computer uses when these same unknown individuals are later "seen" in a video by the system. In one mode of the invention, the user is prompted to provide identifications for any of these unknown individuals, during processing of the video or afterward, wherein the computer generated label is replaced by the name provided to the individual by the user, which thereby adds to the repository of known individuals.

Figure 4:
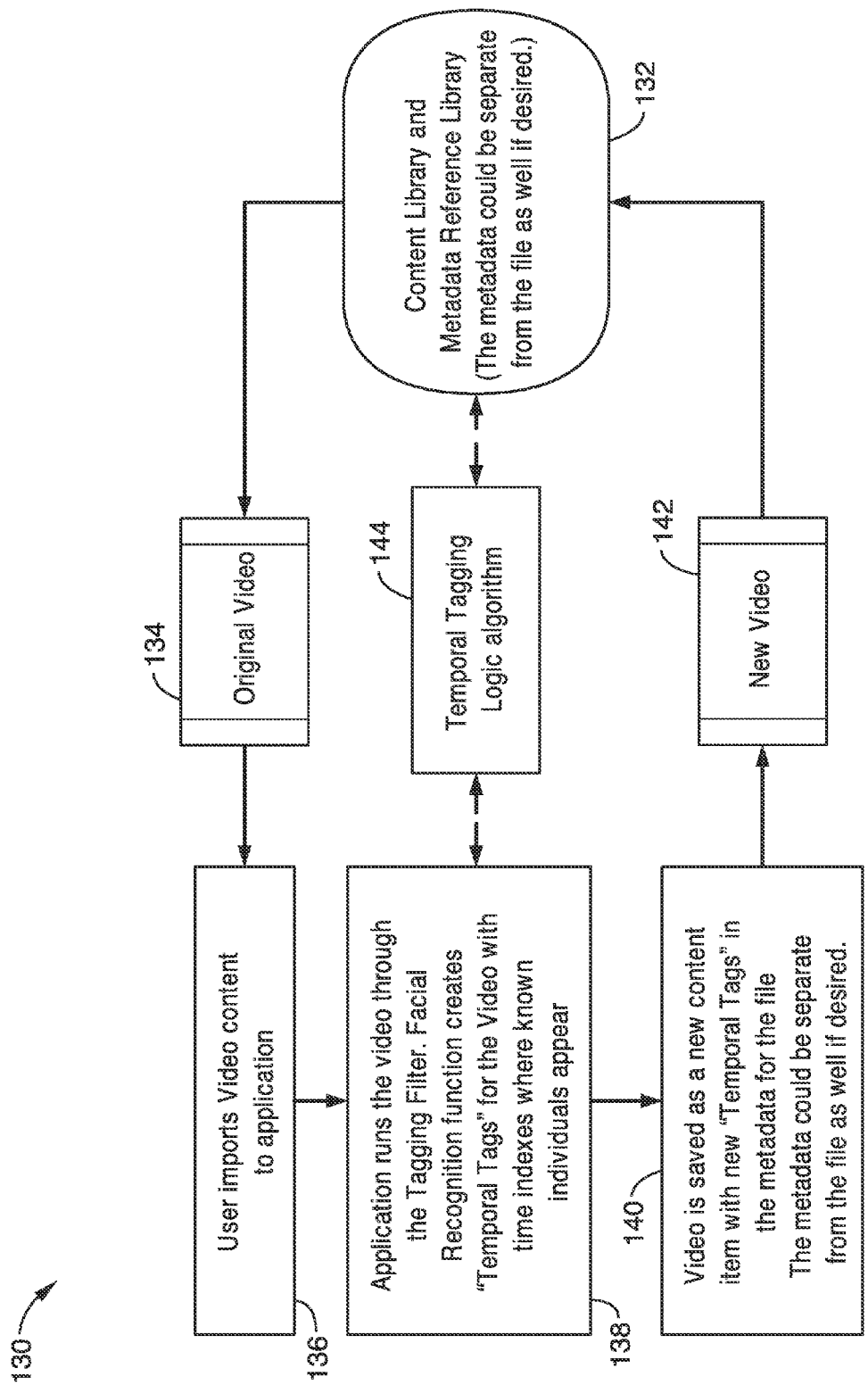
FIG. 4 is a timeline of context control logic according to an embodiment of the invention shown controlling what portions of a video are selected for viewing in response to facial detection of an individual.

FIG. 4 illustrates an example embodiment of automatic temporal tagging 130, without manual editing according to an embodiment of the invention. From the available content 132, a video 134 is imported by the user 136. The video is shown being run through a tagging filter 138 which is exemplified as using facial recognition to create temporal tags at the locations where specific individuals appear in the video. After tagging, the content and metadata libraries are updated 140 as necessary in response to the changes, and new files can be output 142 by the system for inclusion in the content library and/or metadata reference library 132. It will be noted that the tagging performed in block 138 is performed in response to a temporal tagging logic algorithm 144 from information extracted from the metadata reference library and content libraries.

Figure 5A:
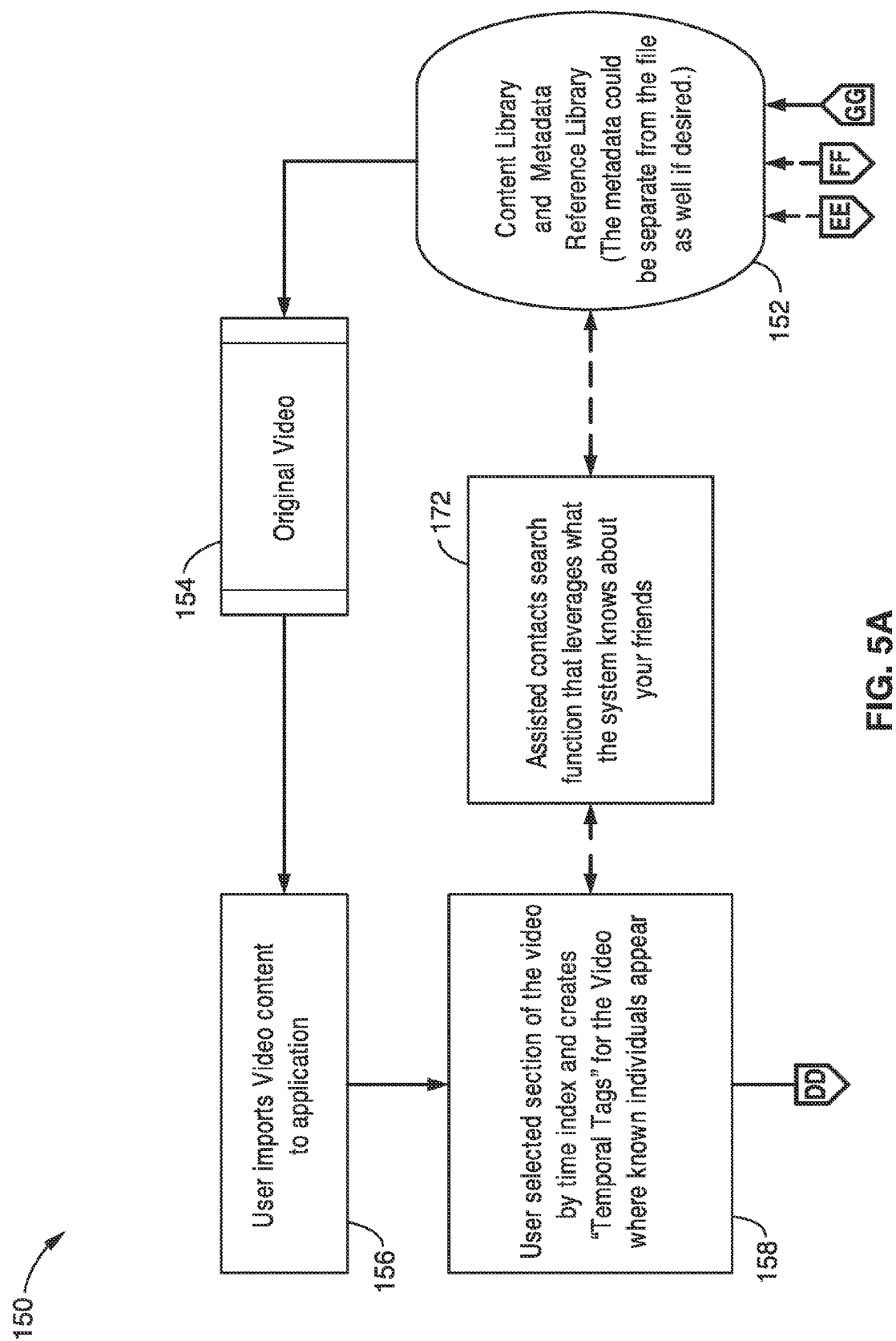
FIG. 5A and FIG. 5B are a flow diagram of automatic temporal tagging according to an embodiment of the invention.
Figure 5B:
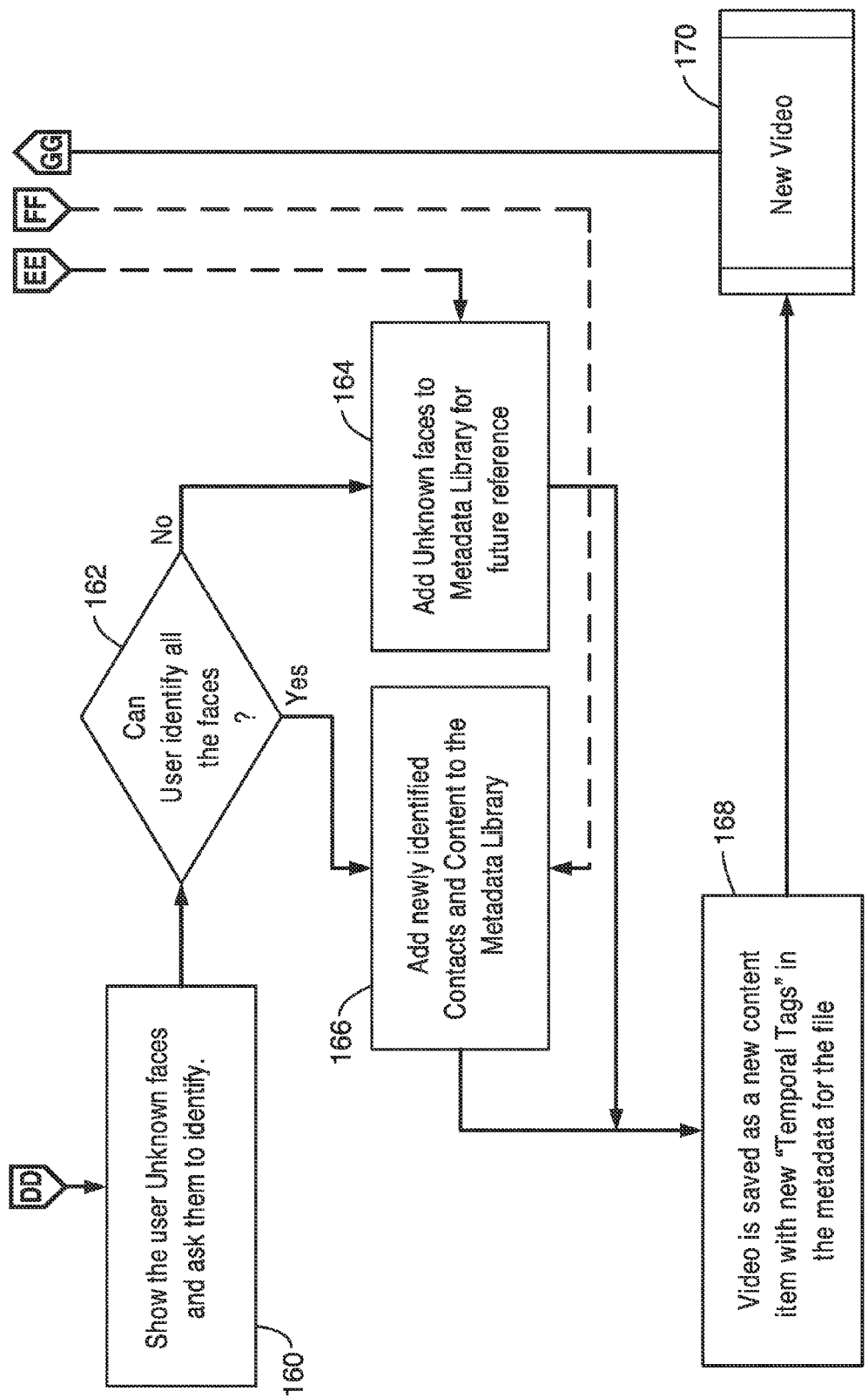

FIG. 5A and FIG. 5B illustrate an example embodiment of manual temporal tagging 150. From the available content 152 (FIG. 5A), a video (original video) 154 is imported by a user under the application 156. Using commands of the TVT application, the user selects one or more sections of the video to be temporally tagged 158, in response to elements found at those locations, more particularly in response to recognizing individuals appearing at those locations in the video. The user is then prompted by the application to identify other elements 160 (FIG. 5B), more particularly individuals whose faces were not identifiable in response to the facial recognition database. It is determined if the user recognizes the elements, in particular the faces, at block 162, such that either unknown faces 164, or identified contacts 166, are added to the metadata library. The flowchart depicts a dashed line from block 152 with a block 172 to represent that the identification operation is performed in combination with information from the content library and/or metadata reference library, and more particularly in this instance with an assisted contacts search function. After temporal tagging is performed, the video content and/or metadata is saved 168 and the new material 170 added to the libraries.

Figure 6A:
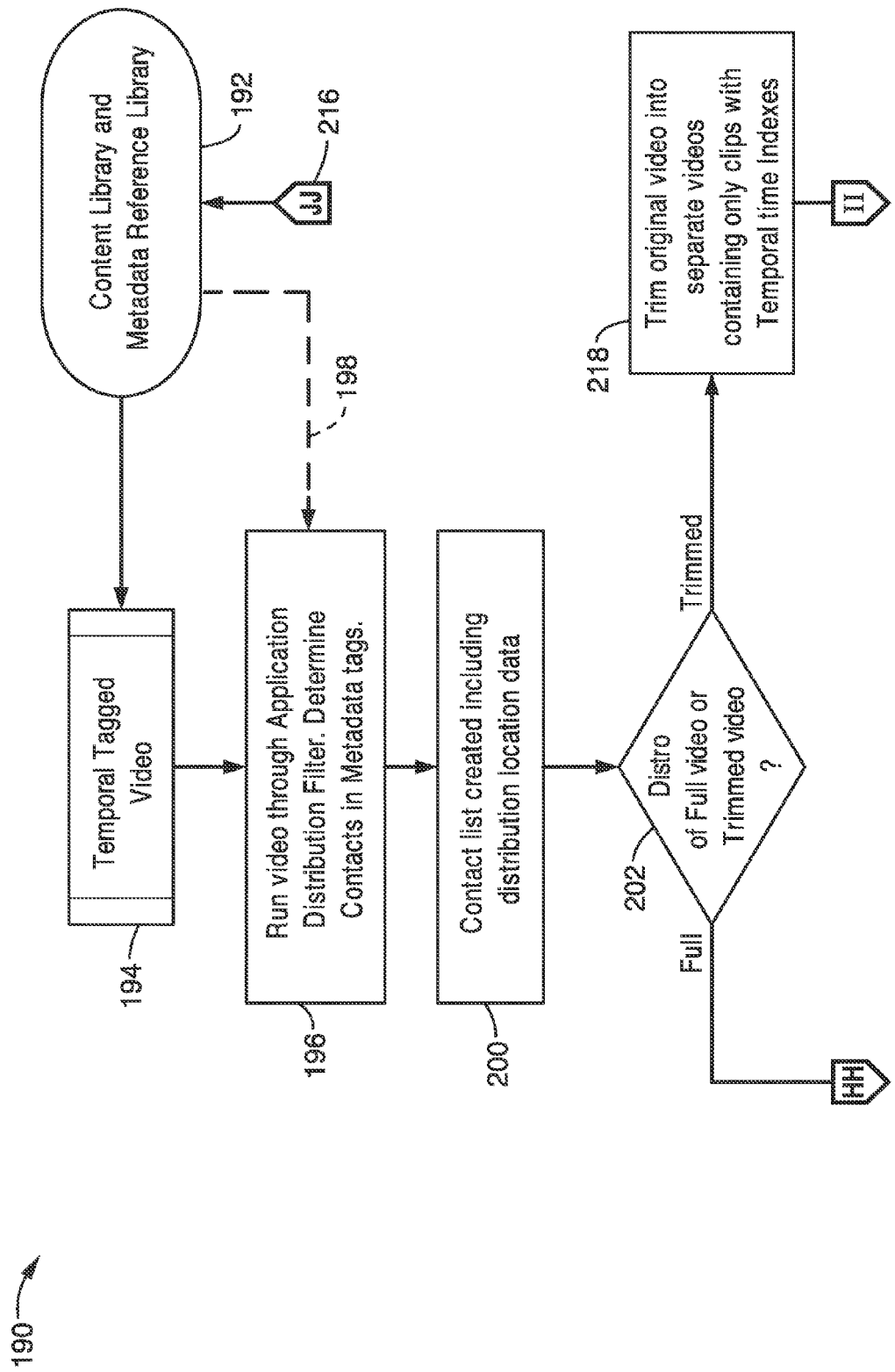
FIG. 6A and FIG. 6B are a flow diagram of manual temporal tagging according to an embodiment of the invention.
Figure 6B:
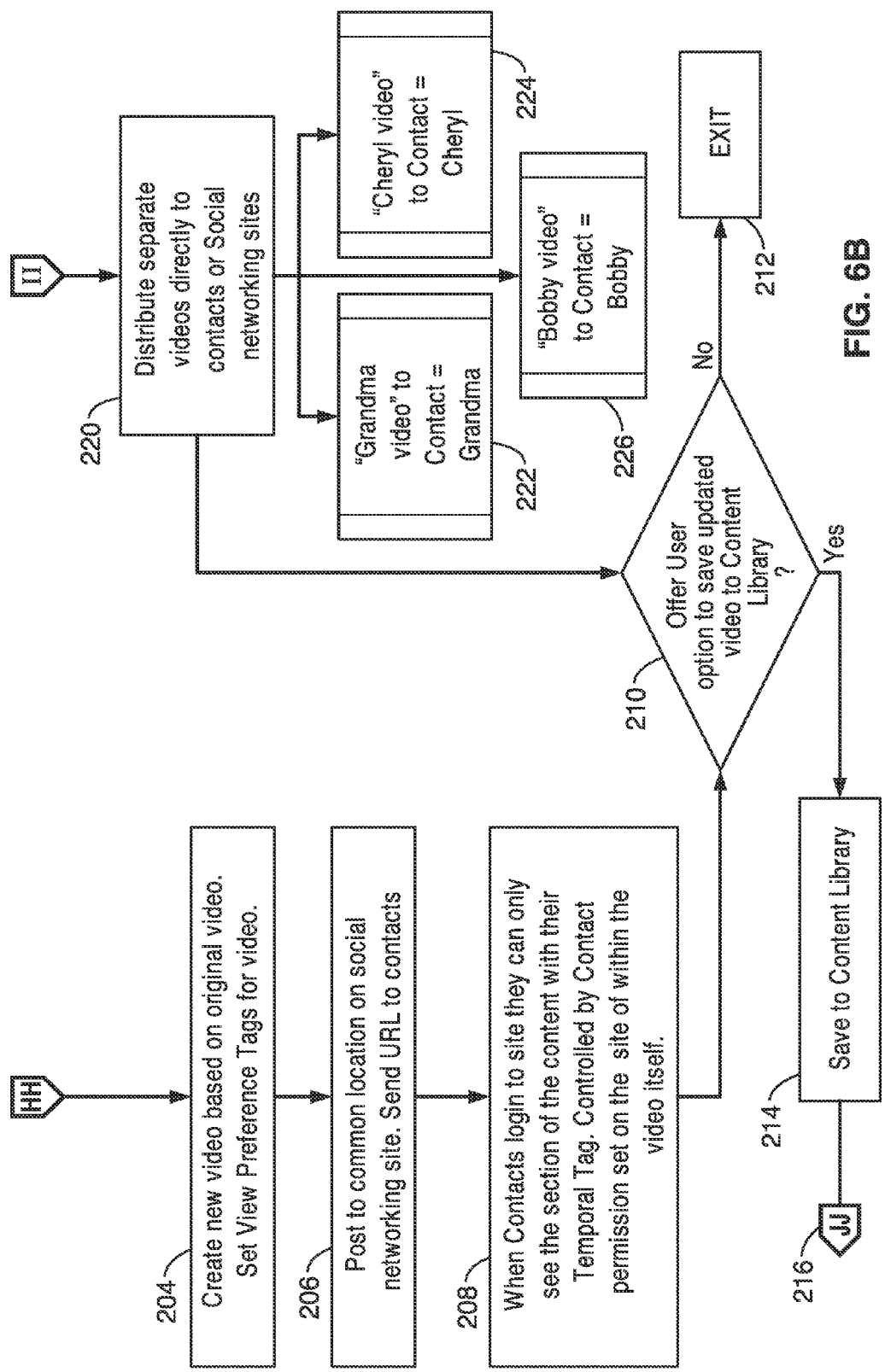

FIG. 6A and FIG. 6B illustrate an example embodiment of automatic temporal tag distribution 190. Video and associated temporal metadata data 194 (FIG. 6A) are obtained from the content library and metadata reference library 192 and run through a distribution filter 196 to determine who the video is to be distributed to in response to comparing the temporal tags contained in the video, with the contact information and user distribution preference settings, which are shown being retrieved 198 from the libraries 192. After filtering, a contact list is created 200 which includes distribution location data. It is then determined 202 whether the full tagged video, or trimmed videos, are to be distributed. In the case of full videos, a new video is created 204 (FIG. 6B) based on the original with temporal tags within the video, or within an associated metadata file. The new video(s) are then distributed 206, exemplified by way of example and not limitation by posting to a social networking site, with the users being contacted, such as being sent a URL directed to the locations within the posting site. Upon users logging in to view the video content 208, they are allowed only to see the portions of the video in response to the settings of the temporal tags in combination with the contact permissions. The user is prompted 210 and can select to exit 212, or save 214 the video to their content library 216.

Returning to block 202 (FIG. 6A), in the case where the user selects to distribute trimmed videos, execution advances to block 218 in which the original video is trimmed into separate videos containing only desired segments of the original video as determined by the temporal tagging. Distribution is then performed on the trimmed videos (video segments separately, or combinations of segments) 220 (FIG. 6B), such as either direct distribution (e.g., email) or through social networking sites. Examples are shown as "Grandma video" to contact=Grandma 222, "Cheryl video" to contact=Cheryl 224, and "Bobby video" to contact=Bobby 226. After selecting options for trimmed distribution, the user is also prompted 210 for saving the content. In at least one embodiment of the invention, the user is also allowed to distribute both full length videos with the temporal tags, as well as trimmed videos (with or without temporal tags).

In a preferred embodiment of the invention, the temporal tags provide indexes indicating "appearances" and "disappearances" of individuals in the associated video. The invention is configured to assure that playing of the videos in response to the temporal tagging is smooth, without jumping in and out of video segments. It will be noted that when capturing video of an event, the persons participating in the event are not always within the camera frame, and the camera may pan past them at certain times or around them at other times. To assemble shots of an individual which includes a number of these brief (e.g., one second) "passing shots", would make for a very distracting video. In addition, the context of the event could be lost if only the shots of the individual were used. Still further it should be appreciated that the voice of an individual may be recorded even if their face is not in the shot to be recognized. For example, "George" may be speaking to a group, while the camera pans the audience getting the reaction to what George is saying. The system recognizes that George is still in the video in response to recognizing his voice. The present invention thereby is configured in this way and in response to control logic for "smoothing" out video and audio context situations.

Figure 7:
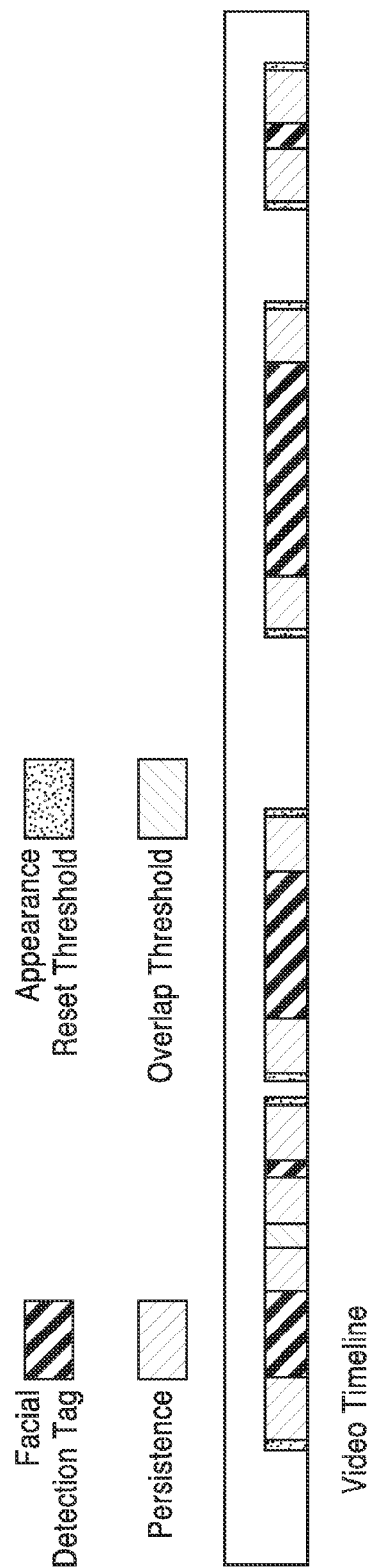
FIG. 7 is a flow diagram of automatic temporal tag distribution according to an embodiment of the invention.

FIG. 7 illustrates an example embodiment of logic for controlling shot contexts in response to variables "facial_detection_tag" and "persistence", "appearance_reset_threshold" and "overlap_threshold".

The facial_detection_tag indicates the sections of video in which the individuals face is detected. In at least one embodiment, this tag is used to sense both facial detection and voice recognition detection. The overlap_threshold allows video clip sections of close temporal proximity to be made contiguous. The persistance value (e.g., on the order of 5 seconds to 5 minutes) establishes the length (duration) of video played for the viewer after a given person (or thing) of interest is out of the scene, which can arise for instance simply from panning the camera. Thus, if two sections of video have overlapping "persistence" areas, they can be deemed as one contiguous video clip. A longer time value is the appearance_reset_threshold which controls how long an individual must be "absent" from a video before the system logs this position in video as the end of their presence, (e.g., 1 minute to 10 minutes).

An example video timeline is depicted in FIG. 7 showing the operation of these values. Moving from left to right in the timeline, an individual appears opening the appearance reset threshold, is subject to persistance time period to a facial detection of the individual, more persistence, an overlap threshold joining this segment with the next due to its close proximity, additional persistence to another facial detection followed by a persistance interval after which the appearance reset threshold is met and the individual is no longer considered in the shot, as denoted by unbounded sections. Two other blocks of video are shown in the timeline in which selection of the video to be included in the associated output is controlled by these variables.

These control variables are important, because, a scene rarely shows all persons present at an event at all times. Cameras pan back and forth through the crowd and activities, and watching very short snippets of individuals in mid-pan could be unseemly. Also how is it to be determined how long video is played of "Uncle Charlie" after the system identifies him at the particular location within the video. Still further, once "Uncle Charlie" is off camera and video playback concerning him would cease, how would he then be identified and seen when he is later identified in the video.

The following shows the logic of another embodiment for controlling video context.
1. Face Detection
    a. Face detected at time A.
    b. Face no longer detected at time B.
    c. Face detected again at time C.
    d. Face no longer detected at time D.
        i. Note: Time A<B<C<D
2. If time (C−B)>=Reset_Threshold, mark both segments as separate scenes.
    a. When data used, scene is buffered on both sides of the tagged timeframe first. So:
        i. Min. prelude time of X sec.
           Min postlude time of Y sec.
        ii. So the scenes would be:
            1. Scene 1: (B+Y)−(A−X) seconds
            2. Scene 2: (D+Y)−(C−X) seconds
    b. In a preferred embodiment both video and audio analysis is performed to determine whether anything important was happening outside of that timeframe before the face is detected and after it goes away.
        i. Look at the scene changes to determine whether the location has changed
        ii. Look at the audio to determine whether the scene has changed.
        iii. In this case, min. pre & postlude times might not hold, with smart algorithm used to decide total scene
3. If time (C−B)<Reset_Threshold, mark both segments as the same scene.
    i. Using the min. time method shown above, the scenes would be:
        1. Scene 1: (D+Y)−(A−X) seconds The above descriptions are provided by way of example only, as one of ordinary skill in computer programming will appreciate that these control mechanisms can be implemented in innumerable ways without departing from the teachings of the present invention.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

From the discussion above it will be appreciated that the invention can be embodied in various ways, including the following:

1. An apparatus for processing a video, comprising: a computer; programming executable on said computer for processing a video received by said computer, said processing comprising: performing facial recognition of images in said video to identify one or more persons in said images; comparing persons identified by said facial recognition with persons contained in a contact library; generating temporal tags corresponding to locations in said video at which persons contained in said contact library are identified in said video; and storing said temporal tags in association with said video; wherein said temporal tags determine which portions of said video a recipient is able to subsequently view based on a correspondence between said temporal tags and identification of the recipient.

2. The apparatus of embodiment 1, wherein said storing said temporal tags in association with said video comprises storing said temporal tags in said video.

3. The apparatus of embodiment 1, wherein said storing said temporal tags in association with said video comprises storing said temporal tags in a file separate from said video.

4. The apparatus of embodiment 1, wherein said facial recognition is based on facial recognition identification information stored in a file separate from said video.

5. The apparatus of embodiment 4, wherein said processing further comprises storing facial recognition identification information in a content library, metadata reference library, or within social networking sites associated with a given user of said apparatus.

6. The apparatus of embodiment 1, further comprising: programming executable on said computer for distributing said video and said associated temporal tags to a plurality of recipients; wherein access to locations in said video by a said recipient is determined based on relationship between the identification of the persons in the temporal tags and the identification of said recipient.

7. The apparatus of embodiment 6, further comprising programming executable on said computer for loading said video and associated temporal tags onto a social networking server configured to provide selective access to said video to logged-in users based on relationship between the identification of the persons in the temporal tags and the identification of said logged-in users as recipients.

8. The apparatus of embodiment 1, further comprising: programming executable on said computer for trimming said video into trimmed video clips based on relationship between the identification of persons in said temporal tags and the identification of a said recipient, and distributing the trimmed video clips to said recipient.

9. The apparatus of embodiment 8, further comprising programming executable on said computer for loading said trimmed video clips onto a social networking server configured to provide selective access to said trimmed video clips to logged-in users.

10. The apparatus of embodiment 1, wherein said video and said associated temporal tags are configured for viewing on a viewing application which controls access to portions of said video based on a comparison between the identity of the viewer and the identification of a person in said video.

11. The apparatus of embodiment 1, wherein said processing further comprises automatically generating said temporal tags in response to facial recognition data and contact information.

12. The apparatus as of embodiment 1, wherein said processing further comprises generating said temporal tags in response to user control of temporal tag placements utilized in combination with facial recognition data and contact information.

13. An apparatus for processing a video, comprising: a computer; programming executable on said computer for processing a video received by said computer, said processing comprising: performing facial recognition of images in said video to indentify one or more persons in said images; generating temporal tags for locations in said video at which a said person is contained in a separate contact library is identified in response to facial recognition; wherein said temporal tags comprise indices that indicate locations within said video at which said person appears in said video; storing said temporal tags within said video, or in a file associated with said video; and (a) automatically distributing said video and said associated said temporal tags to a plurality of recipients wherein access to locations in said video by a said recipient is determined in response to correspondence between the temporal tags and the identification of said recipient, or (b) trimming said video into trimmed video clips based on correspondence between said temporal tags and the identification of a said recipient and automatically distributing the trimmed video clips to said recipient.

14. The apparatus of embodiment 13, further comprising programming executable on said computer for automatically distributing said video in response to loading said video and said associated temporal tags, or trimmed versions of the video, onto a social networking server configured to provide selective access to the videos to logged in users.

15. The apparatus of embodiment 13, wherein said video and said associated temporal tags are configured for viewing on a viewing application which controls access to portions of said video based on a comparison between the identity of the viewer and the identification of a person in said video.

16. The apparatus of embodiment 13, wherein said processing further comprises automatically generating said temporal tags in response to facial recognition data and contact information.

17. The apparatus of embodiment 13, wherein said processing further comprises generating said temporal tags in response to user control of temporal tag placements utilized in combination with facial recognition data and contact information.

18. A method of processing a video, comprising: inputting a video into a computer device; identifying one or more persons in said video in response to facial recognition; generating temporal tags for locations in said video at which persons contained in a contact library are identified in response to said facial recognition; and storing said temporal tags within said video, or in a file associated with said video; wherein said temporal tags control which portions of said video a subsequent recipient of said video is able to view based on a correspondence between said temporal tags and the identification of said recipient.

19. The method of embodiment 18, further comprising: (a) automatically distributing said video and said associated said temporal tags to a plurality of recipients wherein access to locations in said video by a said recipient is determined based on relationship between the identification of the persons in the temporal tags and the identification of said recipient; or (b) trimming said video into trimmed video clips based on relationship between the identification of persons in said temporal tags and the identification of a said recipient and automatically distributing the trimmed video clips to said recipient.

20. The method of embodiment 18, wherein said video with said temporal tags are configured for viewing on a viewing application which controls access to portions of said video based on relationship between the identity of a viewer and the identification of one or more persons in said video.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Example Metadata for Temporal Tag

File: Bobs_birthday.avi
Date: 2-14-2012 12:05:25pm
Location: San Diego
<Contact>=Bobby
<ContactID>C001</ContactID>
<Index01>00:00:00-00:01:59</Index01>
<Index02>00:02:50-00:05:20</Index02>
<Index03>01:10:00-01:16:30</Index03>
</Contact>
<Contact>=Cheryl
<ContactID>C002</ContactID>
<Index01>00:00:25-00:03:19</Index01>
<Index02>00:08:10-00:09:25</Index02>
<Index03>01:00:00-01:02:30</Index03>
</Contact>
<Contact>=Sean
<ContactID>C004</ContactID>
<Index01>00:00:25-00:03:19</Index01>
<Index02>00:08:10-00:09:25</Index02>
<Index03>01:00:00-01:02:30</Index03>
</Contact>
<Contact>=Grandma
<ContactID>C006</ContactID>
<Index01>00:06:00-00:07:00</Index01>
<Index02>00:017:50-00:25:20</Index02>
<Index03>01:10:00-01:16:30</Index03>
</Contact>

What is claimed is:

1. An apparatus for processing a video, comprising:
a computer;
programming executable on said computer for processing a video received by said computer, said processing comprising:
performing facial recognition of images in said video to identify one or more persons in said images;
performing voice recognition of persons speaking within said video;
comparing persons identified by said facial recognition and said voice recognition with persons contained in a contact library;
generating temporal tags corresponding to locations in said video at which persons contained in said contact library are identified in said video using a combination of said facial recognition and said voice recognition; and
storing said temporal tags in association with said video;
wherein said temporal tags determine which portions of said video a recipient is able to subsequently view based on a correspondence between said temporal tags and identification of the recipient;
wherein said temporal tags are utilized in combination with an overlap threshold and a persistence value when determining which portions of said video a recipient is able to subsequently view;
wherein said persistence value establishes length of video played for the recipient after persons identified by facial or voice recognition are out of a scene; and
wherein said overlap threshold is configured to increase persistence by making video sections contiguous which have close temporal proximity and the same identified persons;
wherein an appearance reset threshold is configured with a longer time duration than said persistence value, in which said appearance reset threshold establishes length of time an identified person must be absent from a video segment before considering this position in the video as the end of their presence.

2. The apparatus recited in claim 1, wherein if said appearance reset threshold is exceeded, based upon absence of the identified person from the video segment, then the portions of the video segment in which the identified person is present are marked as separate scenes.

3. The apparatus recited in claim 1, wherein said storing said temporal tags in association with said video comprises storing said temporal tags within said video or in a file separate from said video.

4. The apparatus recited in claim 1, wherein said facial recognition is based on facial recognition identification information stored in a file separate from said video.

5. The apparatus recited in claim 4, wherein said processing further comprises storing facial recognition identification information in a content library, metadata reference library, or within social networking sites associated with a given user of said apparatus.

6. The apparatus recited in claim 1, further comprising:
programming executable on said computer for distributing said video and said associated temporal tags to a plurality of recipients;
wherein access to locations in said video by a said recipient is determined based on relationship between the identification of the persons in the temporal tags and the identification of said recipient.

7. The apparatus recited in claim 6, further comprising programming executable on said computer for loading said video and associated temporal tags onto a social networking server configured to provide selective access to said video to logged-in users based on relationship between the identification of the persons in the temporal tags and the identification of said logged-in users as recipients.

8. The apparatus recited in claim 1, further comprising: programming executable on said computer for trimming said video into trimmed video clips based on relationship between the identification of persons in said temporal tags and the identification of a said recipient, and distributing the trimmed video clips to said recipient.

9. The apparatus recited in claim 8, further comprising programming executable on said computer for loading said trimmed video clips onto a social networking server configured to provide selective access to said trimmed video clips to logged-in users.

10. The apparatus recited in claim 1, wherein said video and said associated temporal tags are configured for viewing on a viewing application which controls access to portions of said video based on a comparison between the identity of the viewer and the identification of a person in said video.

11. The apparatus recited in claim 1, wherein said processing further comprises automatically generating said temporal tags in response to facial recognition data and contact information.

12. The apparatus as recited in claim 1, wherein said processing further comprises generating said temporal tags in response to user control of temporal tag placements utilized in combination with facial recognition data and contact information.

13. An apparatus for processing a video, comprising:
a computer;
programming executable on said computer for processing a video received by said computer, said processing comprising:
performing facial recognition of images in said video to identify one or more persons in said images;
performing voice recognition of persons speaking within said video;
generating temporal tags for locations in said video at which a said person is contained in a separate contact library is identified in response to a combination of facial recognition and said voice recognition;
wherein said temporal tags comprise indices that indicate locations within said video at which said person appears in said video, or are heard therein;
storing said temporal tags within said video, or in a file associated with said video; and
selecting portions of said video a recipient is able to view in response to correspondence between the temporal tags and the identification of said recipient, as well as a persistence value and overlap threshold;
wherein said temporal tags are utilized in combination with an overlap threshold and a persistence value when determining which portions of said video a recipient is able to subsequently view;
wherein said persistence value establishes length of video played for the recipient after persons identified by facial or voice recognition are out of a scene; and
wherein said overlap threshold is configured to increase persistence by making video sections contiguous which have close temporal proximity and the same identified persons;
wherein portions of said video are configured for the recipient to view in response to: (a) automatically distributing said video and said associated said temporal tags to a plurality of recipients wherein access to locations in said video by a said recipient is determined in response to correspondence between the temporal tags and the identification of said recipient;
or (b) trimming said video into trimmed video clips based on correspondence between said temporal tags and the identification of a said recipient and automatically distributing the trimmed video clips to said recipient;
wherein an appearance reset threshold is configured with a longer time duration than said persistence value, in which said appearance reset threshold establishes length of time an identified person must be absent from a video segment before considering this position in the video as the end of their presence.

14. The apparatus recited in claim 13, further comprising programming executable on said computer for automatically distributing said video in response to loading said video and said associated temporal tags, or trimmed versions of the video, onto a social networking server configured to provide selective access to the videos to logged in users.

15. The apparatus recited in claim 13, wherein said video and said associated temporal tags are configured for viewing on a viewing application which controls access to portions of said video based on a comparison between the identity of the viewer and the identification of a person in said video.

16. The apparatus recited in claim 13, wherein said processing further comprises automatically generating said temporal tags in response to facial recognition data and contact information.

17. The apparatus recited in claim 13, wherein if said appearance reset threshold is exceeded, based upon absence of the identified person from the video segment, then the portions of the video segment in which the identified person is present are marked as separate scenes.

18. A method of processing a video, comprising:
inputting a video into a computer device;
identifying one or more persons in said video in response to facial recognition;
identifying one or more persons in said video in response to voice recognition of persons speaking within said video;
generating temporal tags for locations in said video at which persons contained in a contact library are identified in response to using a combination of said facial recognition and said voice recognition; and
storing said temporal tags within said video, or in a file associated with said video;
wherein said temporal tags control which portions of said video a subsequent recipient of said video is able to view based on a correspondence between said temporal tags and the identification of said recipient;
wherein said temporal tags are utilized in combination with an overlap threshold and a persistence value when determining which portions of said video a recipient is able to subsequently view;
wherein said persistence value establishes length of video played for the recipient after persons identified by facial or voice recognition are out of a scene; and
wherein said overlap threshold is configured to increase persistence by making video sections contiguous which have close temporal proximity and the same identified persons;
further comprising wherein an appearance reset threshold which is configured with a longer time duration than said persistence value wherein said appearance reset threshold establishes length of time an identified person must be absent from a video segment before considering this position in the video as the end of their presence.

19. The method recited in claim 18, further comprising:
(a) automatically distributing said video and said associated said temporal tags to a plurality of recipients wherein access to locations in said video by a said recipient is determined based on relationship between the identification of the persons in the temporal tags and the identification of said recipient; or
(b) trimming said video into trimmed video clips based on relationship between the identification of persons in said temporal tags and the identification of a said recipient and automatically distributing the trimmed video clips to said recipient.

20. The method recited in claim 18, wherein if said appearance reset threshold is exceeded, based upon absence of the identified person from the video segment, then the portions of the video segment in which the identified person is present are marked as separate scenes.

* * * * *